United States Patent [19]

Laing

[11] 4,219,075
[45] Aug. 26, 1980

[54] HEAT STORAGE DEVICE

[76] Inventor: Ingeborg Laing, Hofener Weg 35-37, D 7141 Aldingen, Fed. Rep. of Germany

[21] Appl. No.: 805,561

[22] Filed: Jun. 10, 1977

[30] Foreign Application Priority Data

May 4, 1977 [AT] Austria ............................ 3176/77

[51] Int. Cl.² ............................................ F28D 21/00
[52] U.S. Cl. ............................ 165/104 S; 165/109 R; 165/111
[58] Field of Search ................. 165/104 S, 107, 109, 165/111; 126/400

[56] References Cited

U.S. PATENT DOCUMENTS

| | | |
|---|---|---|
| 2,902,839 | 9/1959 | Marshall ..................... 165/104 S X |
| 3,974,642 | 8/1976 | Pacault ....................... 165/104 S X |
| 4,064,931 | 12/1977 | Laing ........................... 165/104 S X |
| 4,109,702 | 8/1978 | Greene ....................... 165/104 S X |

Primary Examiner—Albert W. Davis
Attorney, Agent, or Firm—Pennie & Edmonds

[57] ABSTRACT

In a heat storage device which utilizes the latent heat of fusion of a storage mass, the specific gravity of a heat carrier liquid is sufficiently different from that of the molten storage mass which is substantially immiscible with the liquid, for layers to be formed, and the rotor of a pump or mixer is so arranged in a layer of the liquid that a vortex is formed, whereby a mixture of the molten mass and the carrier liquid is sucked up by it. The mass is diminuted into small spheres and the heat exchange between the latter and the carrier liquid is intensified.

17 Claims, 8 Drawing Figures

HEAT STORAGE DEVICE

BACKGROUND OF THE INVENTION

The invention relates to a heat storage device having a storage vessel, in which the storage mass is disposed which stores latent heat in the course of its transition from the solid to the liquid state, as well as a heat carrier liquid circuit, by means of which the stored heat is fed to the heat emitting element.

Heat storage devices having storage masses are known, which are capable of storing heat in the course of their transition from the solid to the liquid aggregate state. Heat is withdrawn from these heat storage devices by employing as a heat carrier liquid a liquid which is immiscible with the liquid storage mass and which is pumped directly through the storage mass and then through the heat emitting element. The following disadvantages of this arrangement have become known:

(a) The heat exchange between a heat storage mass and a heat carrier liquid flowing therethrough becomes increasingly difficult owing to the increase in the thickness of the layer of the solidified heat storage mass.

(b) The difference in volume of the storage mass between the molten and the solidified phase causes high mechanical stresses in the structural elements, i.e. the storage vessels and the heat exchangers.

(c) As it discharges, the storage mass solidifies into a single solid body, which presents the heat conduction with a high heat resistance during charging.

The object of the invention is to eliminate these disadvantages. This object of the invention is fulfilled by means of a storage mass and a selected heat carrier liquid which is not or only slightly miscible with the melt of the storage mass and where the specific gravity of the storage mass, differs so considerably from the specific gravity of the melt, that layers are formed, and that a pump or mixer rotor is so arranged in the heat carrier liquid layer, that a vortex is formed, whereby a mixture of the storage mass melt and of the heat carrier liquid is sucked up. What is achieved in this way is that, on the one hand, the solidified heat storage mass is divided into minute spheres and, on the other hand, an intensive heat exchange between the storage mass and the heat carrier liquid is accomplished.

In a first embodiment the heat carrier liquid is disposed above the melt. In a second embodiment the storage mass floats on the heavy heat carrier liquid. In the case of the first embodiment there is provided at the top in the storage vessel, and in the case of the second embodiment at the bottom in the storage vessel, a pump rotor, which produces a vortex. In a third embodiment the heat carrier liquid is disposed between the melt and the solid storage mass; then the pump rotor is disposed between the layers of storage mass. The liquid storage mass penetrates into the vortex of the pump rotor and broken up by the pump rotor into minute droplets which assume a spherical shape on account of the surface tension and which then give off their heat to the heat carrier liquid. After solidification, the small spheres are again moved back into the storage mass layer by gravity and by centrifugal forces. Since the entire interior of the circular cylindrical storage vessel performs a revolving current, the spheres are moreover thrown outwardly, so that that region of the melt which enters the vortex remains free from these small spheres. Converse separation occurs where the melt is heavier than the solid storage mass, as is for example the case with water.

In certain circumstances the pump rotor may be dispensed with for charging. Preferably however it is driven during charging also. Only when sufficient storage mass has been melted, it accelerates the heat exchange and thereby reduces the temperature gradient between the heat carrier liquid and the storage mass, so that the charging can also take place via the heat carrier liquid. For the heat carrier liquid, water may, for example, be considered and for the storage mass, wax. The same invention may, however, also be applied in relation to salt melts, particularly hydrates of metal salts. Chlorinated hydrocarbons which are heavier than the salts or hydrocarbons such as benzene, light oil, silicone oil, ketones, cyclohexane, toluol or xylol, which are lighter than the salts, may then, for example, serve as the heat carrier liquid. Where water is used as the storage mass, silicon oil may be considered as the heat carrier liquid.

The pump rotor produces a whirl. Furthermore it has the effect of causing mechanical diminution of the storage mass which has been sucked up. Moreover it effects rotation of the contents of the storage vessel. This rotation can be enhanced by tangential introduction of the return flow of the heat carrier liquid from the exterior heat exchange circuit, so that the separation of solid storage mass, liquid storage mass and the heat carrier liquid takes place in the centrifugal force field, whereby heat storage mass can, in the region adjacent to the axis, be prevented from being taken along into the exterior heat exchange circuit.

Volume equalisation is achieved by an elevated container or an elastic displacement device communicating with the heat carrier liquid.

BRIEF DESCRIPTION OF THE DRAWINGS

FIG. 5a is a sectional side view of a portion of FIG. 5 taken along lines 5a—5a.

DETAILED DESCRIPTION OF THE PREFERRED EMBODIMENTS

Figure 1:
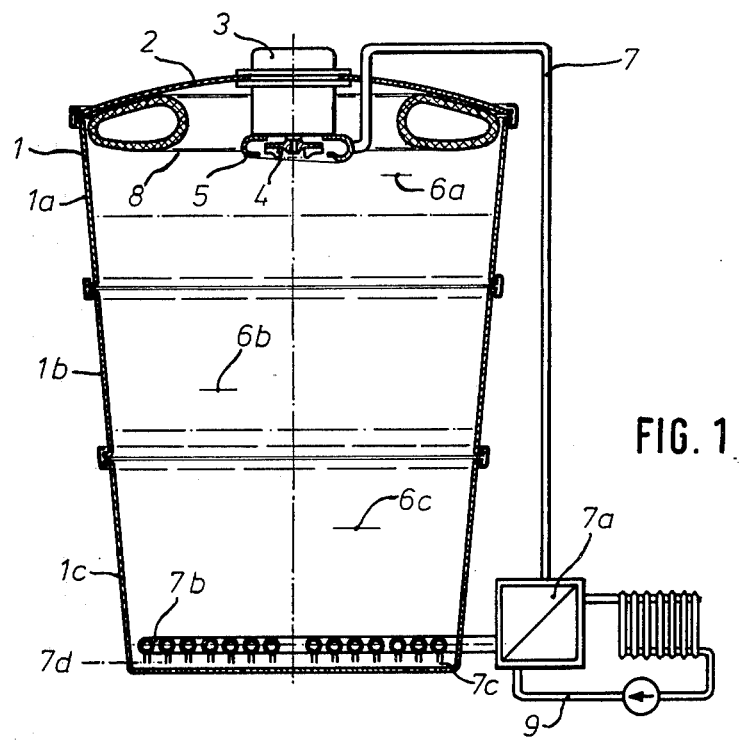
FIG. 1 is a sectional side view of a heat storage device constructed according to the invention in which the heat carrier liquid has a lower specific gravity than the storage mass in the molten state.

FIG. 1 shows a heat storage device embodying the invention whose storage vessel 1 is slightly conically enlarged and, for transport purposes, consists of sections 1a to 1c which can be assembled at site. A motor 3, which drives a pump rotor 4 is arranged on the cover 2. This rotor is partly surrounded by a spiral housing 5, which leads to a heat exchanger 7a via the conduit 7. A spiral pipe 7b having a plurality of downwardly opening pipes 7c, through which the heat carrier liquid can again be returned to the storage vessel, is arranged on the floor of the storage vessel 1. The heat carrier liquid of low specific gravity is disposed in the space 6a; the molten storage mass in the space 6b, and the solid storage mass in the space 6c. The apertures of the pipes 7c prevent the ingress of melt into the pipes 7c, if they are disposed accurately in a horizontal plane 7d. If, after a prolonged cooling period, the storage mass 6b and 6c has solidified into a solid body, the hydrostatic superatmospheric pressure of the heat carrier liquid which has been heated by the heat exchanger 7a causes raising of, and flushing around, this solid body in the lower region of the storage vessel 1, until it has become fully molten. In the case of discharge over a short period, on the other hand, no uniform solid body is formed, but a mixture of crystals and molten storage mass, through which a stream of heat carrier liquid emerging from the apertures of the pipes 7c flows on account of the difference in the specific gravity. The difference in density between the molten and the solid storage mass is compensated by the diaphragm member 8 which is gas-filled and, if desired, in communication with the ambient air. The circuit 9 serves the purpose of supplying heat, e.g. from a solar collector or a heat pump, and also that of heat removal, e.g. via a domestic hot water circuit.

Figures 2, 2A:
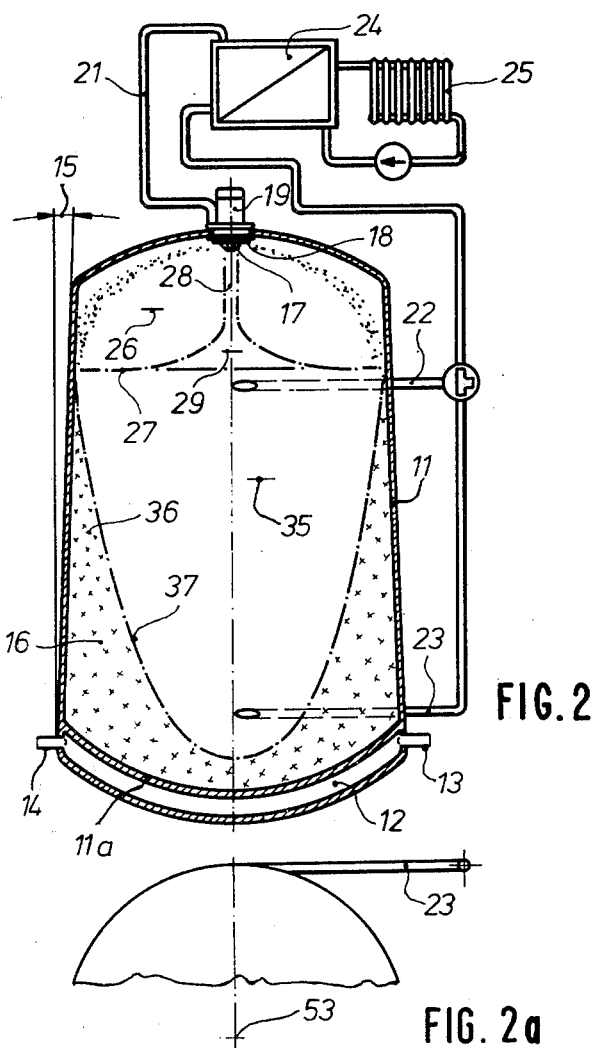
FIG. 2 is a side sectional view of a further embodiment of a heat storage device in which the heat carrier liquid has a lower specific gravity than the storage mass in the liquid state.
FIG. 2a is a partial bottom end view of FIG. 2.
Figure 4:
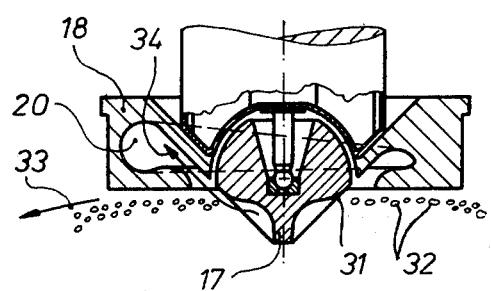
FIG. 4 is an enlarged sectional view of the pump of FIG. 3.
Figure 4A:
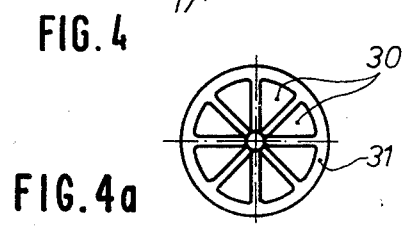
FIG. 4a is an end view of the rotor of the pump of FIG. 4.

FIG. 2 shows a storage vessel 11 embodying the invention which has a hollow wall 12 at its lower end, through which a heat carrier liquid flows via the sockets 13 and 14. In this case the walls of the vessel 11 are of downwardly enlarged conicality 15, so that any solidified storage mass body 16 detaches itself from the wall during charging. In the upper region a pump rotor 17 is disposed, which cooperates with a spiral housing 18. The pump rotor 17 is driven by means of a motor 19 located outside the storage vessel. The spiral duct 20 (FIG. 4) in the spiral housing 18 of the pump opens into the conduit 21. The heat carrier liquid is returned into the interior of the storage vessel 11 through the conduits 22 and 23 which enter the approximately cylindrical storage vessel 11 tangentially. The installation is connected to a heat utilising system 25 via the heat exchanger 24. The upper region 26 of the storage vessels is charged up to the line of separation 27 with a heat carrier liquid of lower specific gravity. As soon as the motor 19 is switched on, a whirl is created in the heat carrier liquid, at the centre 28 of which liquid storage mass 29 is conveyed as far as the rotor 17 against the force of gravity. As can be seen from FIG. 4, the rotor 17 is of open construction and has segmental chambers 30. The storage liquid follows the contour of the marginal region 31 in the direction of the arrow 34 and is thereby flung into the spiral duct 20. As a result of the contact between the storage liquid and the cooler heat carrier liquid, crystallising drops 32 are formed. By reason of their higher specific gravity, the crystallising droplets 32 are flung outwardly in a rotational plane disposed below the spiral housing and then sink down, so that the liquid region 35 is separated from the solid body region 36 by a surface 37 of rotating bodies. This surface 37 becomes progressively smaller, until finally the entire storage mass is crystallised. For the purpose of charging, a heat carrier liquid is conducted through the circuit 13, 12, 14, until all the crystals 16 have again melted. Owing to the weight of the solid storage bodies 16, the melt produced flows away laterally, so that an almost direct contact between the storage mass and the heated wall 11a exists all the time.

Another method of charging in accordance with the invention consists in returning the heat carrier liquid at a temperature which lies above the melting point of the storage mass through the tangentially opening pipes 22 and preferably 23 in the lower region of the storage vessel 11.

Figure 3:
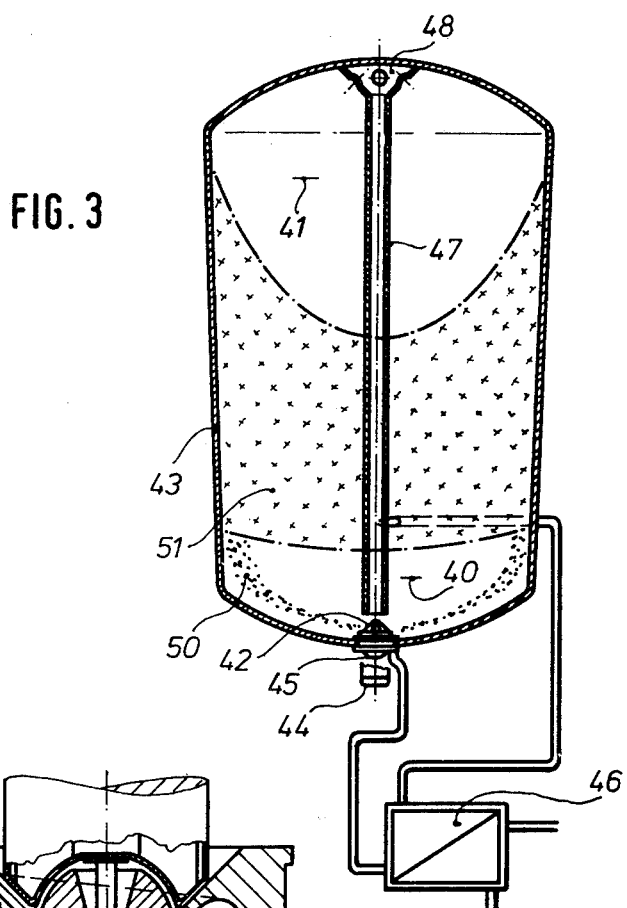
FIG. 3 is a sectional side view of a further embodiment of a heat storage device in which the specific gravity of the heat carrier liquid is greater than the specific gravity of the storage mass in the molten state.

FIG. 3 shows the converse layer configuration. The heat carrier liquid 40 of higher specific gravity is disposed in the lower region, whilst the storage mass 51 floats thereover. Consequently also the rotor 42 is arranged in the lower region of the storage vessel 43 and is driven by an electric motor 44 through a magnetically pervious wall 45. The heat exchanger 46 separates the heating circuit from the heat carrier liquid circuit. The melt 41 reaches the rotor 42 through a pipe 47 which is open in its upper region 48. The crystallising droplets 50 rise and collect in the region of the solidified storage mass 51. For the purpose of charging, the heat carrier liquid is heated via the heat exchanger 46. Initially only heat carrier liquid is sucked up by the rotor 42, liquid storage mass also being sucked up and heated after part of the storage mass has melted, so that heat of fusion is supplied to the storage mass which is still crystallised by the heat carrier liquid as well as also the storage mass which has already melted.

Figure 5:
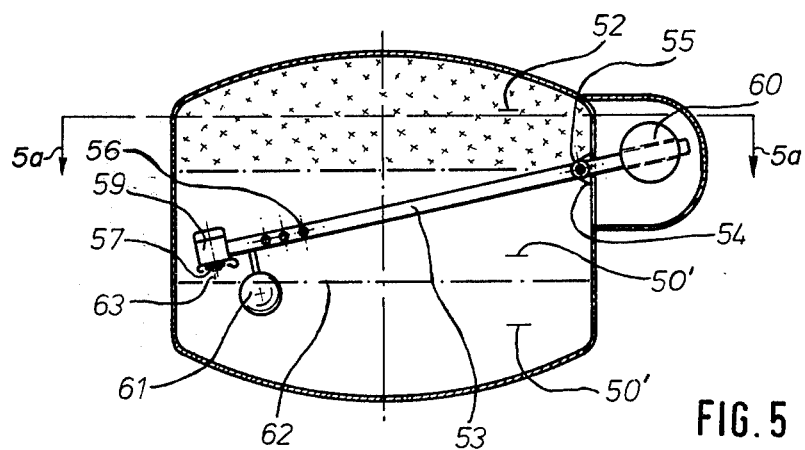
FIG. 5 is a side sectional view of a further embodiment of a heat storage device in which the heat carrier liquid has a lower specific gravity than the storage mass in the molten state but higher than the storage mass in the solid state.
Figure 5A:
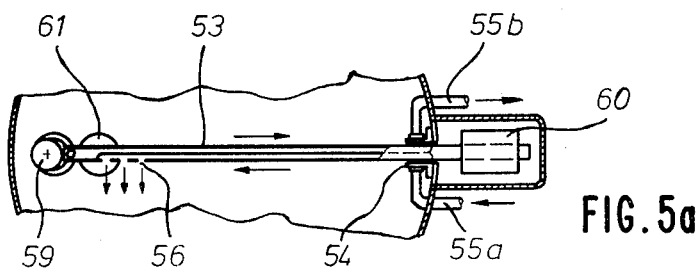

FIG. 5 shows a layer configuration, in which the melt 50' is of higher specific gravity than the heat carrier liquid 51', whilst the crystallised storage mass 52 is of lower specific gravity. Via a pivotable arm 53 having a pivot bearing 54, heat carrier liquid is conveyed into the conduit 55. In the same pivotable pipe 53 the heat carrier liquid is again discharged through the apertures 56. The pump rotor 57 is driven by the motor 59. The counterbalance weight 60 approximately equallises the weight of the motor 59. The float 61 has the function of maintaining a defined spacing 63 between the plane 62 of liquid separation and the pump rotor 57. Two pipes, which lead to the heat exchanger corresponding to 48 (FIG. 3) open into the pivot bearing 55.

I claim:

1. A heat storage device having a storage vessel, a fluid flow circuit external to and in fluid communication with said vessel, a heat storage mass in said vessel adapted to store heat in the course of its transition from a solid to a molten state, and a heat carrier liquid substantially immiscible with said storage mass disposed in said vessel for circulation through said vessel and said circuit and having a specific gravity different from the specific gravity of the storage mass when in the molten state; the improvement comprising in having a pump including a rotor positioned in said vessel to circulate heat carrier liquid through said circuit and drive means for said rotor whereby when said rotor is driven during heat discharge of the device, a mixture of said molten storage mass and said heat carrier liquid is sucked into said pump where said rotor reduces the molten storage mass into a plurality of small droplets which solidify upon transferring their heat to said heat carrier liquid and whereby said solidified droplets are moved by gravity and centrifugal forces imparted by said rotor away from said rotor towards the sides of said vessel.

2. A heat storage device according to claim 1, wherein the specific gravity of said heat carrier liquid is less than the specific gravity of said molten storage mass, said rotor being disposed in an upper region of said vessel.

3. A heat storage device according to claim 1, wherein the specific gravity of said heat carrier liquid is greater than the specific gravity of said molten storage mass, said rotor being located in a lower region of said storage vessel.

4. A heat storage device according to claim 1, wherein the specific gravity of said heat carrier liquid is less than the specific gravity of said molten storage mass and greater than the specific gravity of said storage mass in its solid state, whereby a plane of separation between said carrier liquid and said molten storage mass is formed, said rotor being disposed above said plane of separation.

5. A heat storage device according to claim 1, including means for separating said carrier liquid from droplets of said storage mass into two discharge planes for discharge from said vessel into said external circuit.

6. A heat storage device according to claim 5, wherein said pump is arranged to convey said heat carrier liquid through said external circuit and to return it to said storage vessel.

7. A heat storage device according to claim 1, wherein the arrangement is such that said heat carrier liquid is discharged from said storage vessel into said external circuit in the region of the axis of said storage vessel.

8. A heat storage device according to claim 1, wherein said rotor is an axial flow impeller.

9. A heat storage device according to claim 1, wherein the wall of said storage vessel opens conically upwardly, so that crystals of said storage mass defining a solid body are raised to a small extent by the hydrostatic pressure of the flow of said carrier liquid against the floor of said vessel.

10. A heat storage device according to claim 1, wherein a whirl for separating crystals of said storage mass from said carrier liquid is produced in a layer of the latter.

11. A heat storage device according to claim 10, wherein said rotor producing said whirl is disposed in the vertical axis of the storage vessel.

12. A heat storage device according to claim 11, including a centrifugal pump arranged to circulate said carrier liquid, said rotor also defining the rotor of said centrifugal pump.

13. A heat storage device according to claim 1, wherein the molten said storage mass is circulated in order to avoid stratification.

14. A heat storage device according to claim 1, wherein said storage vessel comprises a heated floor disposed in a lower region of said storage vessel.

15. A heat storage device according to claim 14, wherein the wall of said storage vessel widens conically towards said heated floor.

16. A heat storage device according to claim 1, including a pipe system disposed in said storage vessel and having a plurality of apertures which are orientated in a direction away from said molten storage mass and adapted to conduct said carrier liquid, said pipe system being disposed below said molten storage mass disposed at the bottom of said storage vessel, or above said molten storage mass disposed at the top of said storage vessel.

17. A heat storage device according to claim 1, including a gas-filled hollow body of elastic material disposed in the storage vessel.

* * * * *